United States Patent [19]

Levefelt

[11] 4,284,151
[45] Aug. 18, 1981

[54] LUBRICATING DEVICE

[75] Inventor: Bert G. Levefelt, Sandviken, Sweden

[73] Assignee: Sandvik Aktiebolag, Sandviken, Sweden

[21] Appl. No.: 86,436

[22] Filed: Oct. 19, 1979

[51] Int. Cl.³ .............................................. E21B 10/24
[52] U.S. Cl. .................................... 175/227; 175/337; 308/8.2
[58] Field of Search ............... 175/227, 228, 229, 337; 308/8.2

[56] References Cited

U.S. PATENT DOCUMENTS

| 2,831,660 | 4/1958 | Smiecinski | 175/228 |
| 3,220,496 | 11/1965 | Beck | 175/228 |
| 3,788,408 | 11/1974 | Dysart | 175/337 |

FOREIGN PATENT DOCUMENTS

| 54289 | 12/1967 | Poland | 175/227 |
| 220903 | 11/1965 | U.S.S.R. | 175/337 |
| 474597 | 6/1975 | U.S.S.R. | 175/228 |
| 615192 | 7/1978 | U.S.S.R. | 175/228 |

Primary Examiner—Ernest R. Purser
Assistant Examiner—Richard E. Favreau
Attorney, Agent, or Firm—Burns, Doane, Swecker & Mathis

[57] ABSTRACT

A device for lubricating rotary drill bits of the type comprising a roller cutter (14) which is rotatably carried by means of a bearing system (15, 16, 17, 18). Fluid is supplied to the bearing system for cooling thereof through a cooling passage (31, 32, 33; 51, 61), and a lubricant is delivered to the cooling passage from a lubricant reservoir (36; 46) through a lubricating passage (40; 54). For purposes of controlling the supply of lubricant the outlet of the lubricating passage into the cooling passage is arranged axially behind the inlet of the lubricating passage in the lubricant reservoir.

9 Claims, 4 Drawing Figures

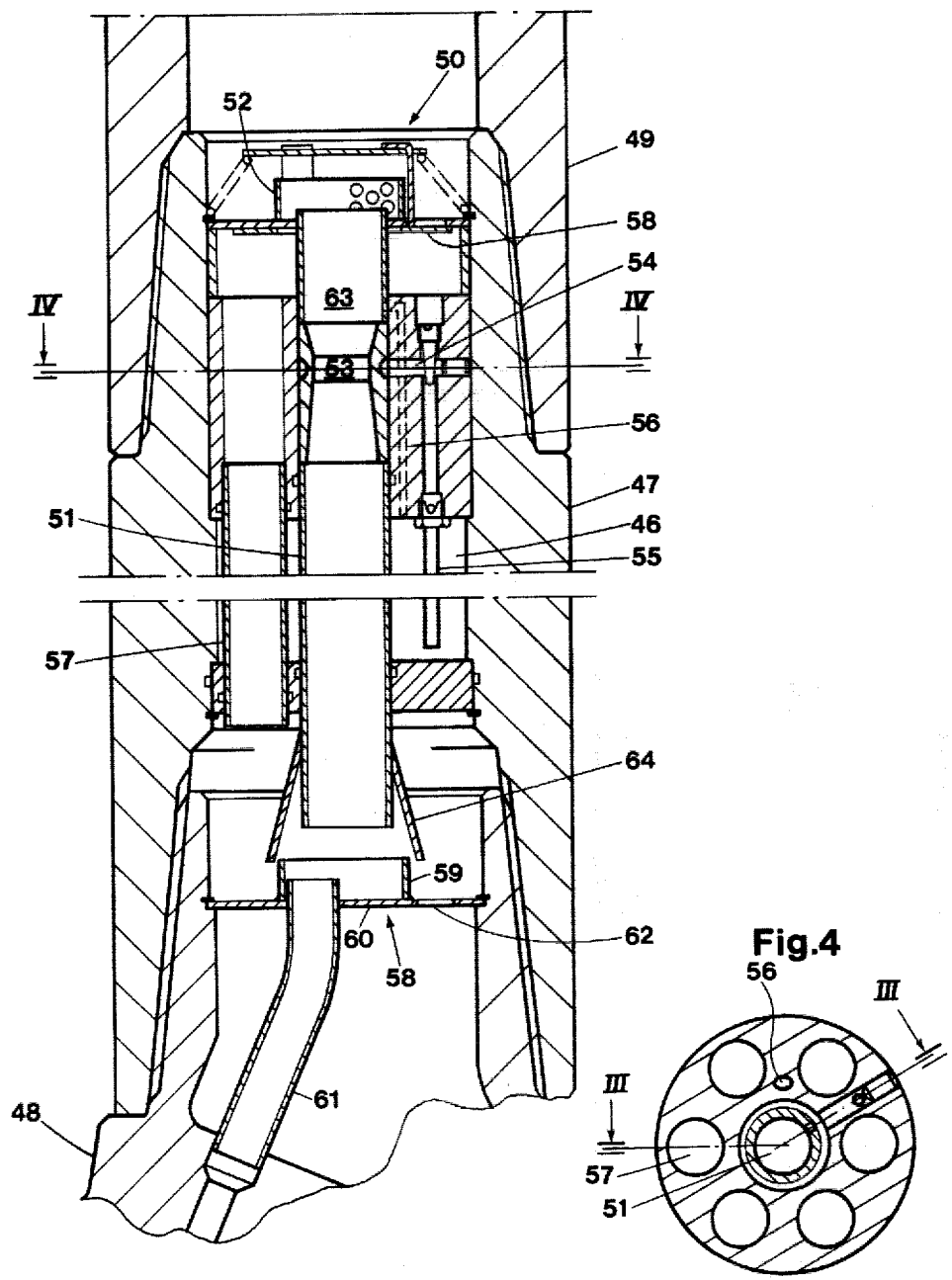

LUBRICATING DEVICE

The present invention relates to a device for lubricating rotary drill bits of the type comprising at least one roller cutter provided with cutting means which is rotatably carried by means of a bearing system. The drill bit is provided with at least one first passage means for supplying flushing fluid to the hole drilled by the drill bit, and at least one second passage means for supplying fluid to the bearing system for cooling thereof. Lubricating means is supplied to the fluid in the second passage means from a lubricant reservoir through a third passage means for simultaneous lubricating of the bearing system.

The bearing systems in rotary drill bits are designed either sealed or unsealed. A sealed design means that the bearing system is sealed and supplied with a lubricant, such as grease or oil, from a reservoir which is built-in inside the drill bit. The lubricant is supplied to the bearing system by means of the difference in pressure inside and outside thereof via a membrane. No air or other cooling medium is supplied to the bearing system. An unsealed design, of which the present invention is an example, means that the bearing system has no sealing means. Impurities are prevented from entering into the bearing system due to the fact that air is supplied thereto, which air flows outwards for forming an air barrier between the roller cutter and the leg associated therewith.

For purposes of lubricating the bearing system it has been proposed to deliver lubricant means to solely that portion of the air which is supplied to the bearing system for cooling and cleaning thereof. U.S. Pat. No. 2,831,660 discloses a design in which a lubricant reservoir is arranged in each of the legs of the drill bit, and the lubricant is delivered to the cooling air through a passage in the leg. U.S. Pat. No. 3,220,496 discloses a design in which lubricant is delivered to the bearing system from an adapter which is mounted between the drill bit and the forward end of the drill string. The pressure of the flushing fluid forces the lubricant to the bearing system via a piston. A similar design is disclosed in U.S. Pat. No. 3,749,186.

A disadvantage of the above-mentioned previously known lubricating devices is that the supply of lubricant from the reservoir has been difficult to control, which means that too much lubricant often has been supplied during the first phase of the drilling operation with the result that all lubricant is consumed in a later phase of the drilling operation, which decreases the life of the drill bit.

An object of the present invention is to provide a rotary drill bit in which the supply of lubricant can be kept on a predetermined and controlled level, thereby making it possible to increase the life of the drill bit. This and other objects are attained by giving the invention the characterizing features stated in the appending claims.

The invention is described in detail in the following with reference to the accompanying drawings in which two embodiments are shown by way of example. It is to be understood that these embodiments are only illustrative of the invention and that various modifications thereof may be made within the scope of the claims.

In the drawings,

FIG. 3 shows a longitudinal section taken on the line III—III in FIG. 4 through an alternative embodiment according to the invention.

FIG. 4 shows a section taken on the line IV—IV in FIG. 3.

Figure 1:
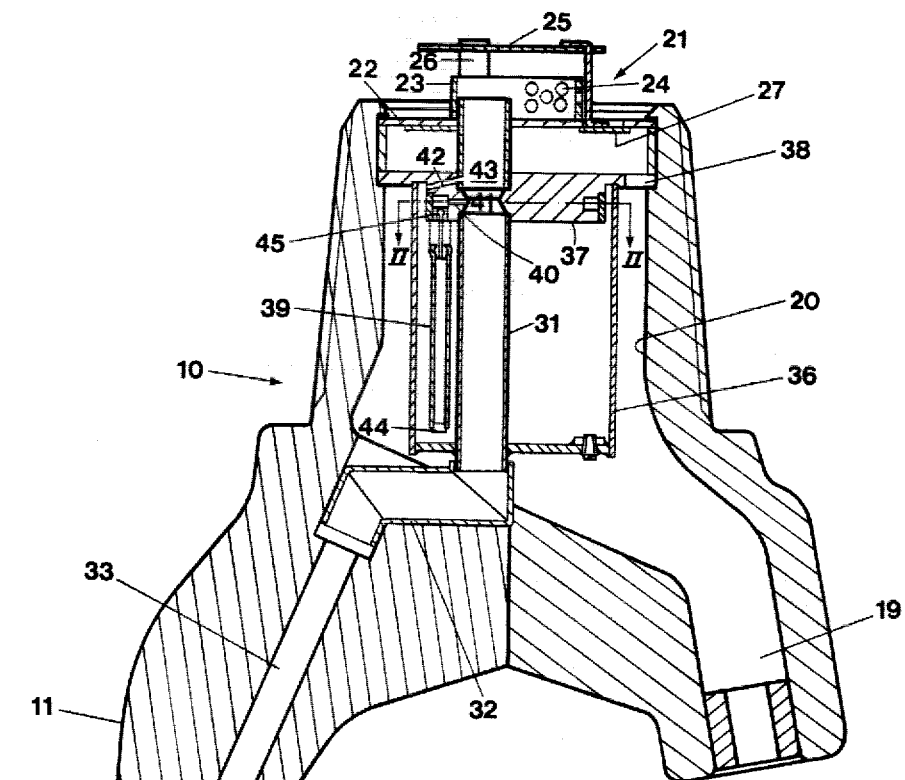
FIG. 1 shows a sectional view of a rotary drill bit according to the invention.
Figure 2:
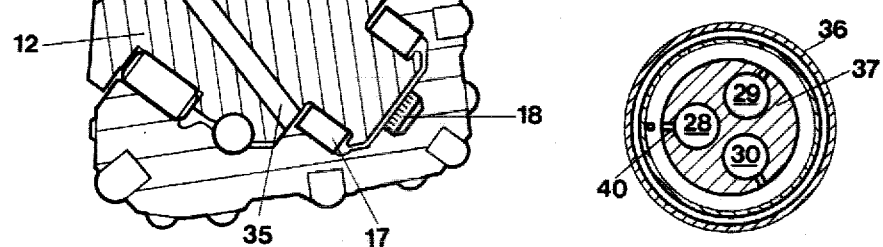
FIG. 2 shows a section taken on the line II—II in FIG. 1.

In FIG. 1 a rotary drill bit 10 is shown having a leg 11 on which a bearing pin 12 is provided. A roller cutter 14 is in conventional manner rotatably journalled on the bearing pin 12 over a bearing system, which comprises a roller bearing 15, a ball bearing 16, a roller bearing 17 and an axial thrust bearing 18. The roller cutter 14 is provided with cutting means in form of hard metal inserts 13. The drill bit 10 has three legs 11 which together with their associated roller cutters 14 are equally circumferentially spaced. For the sake of clarity only one leg is shown in FIG. 1.

The rotary drill bit 10 is provided with a passage 19 for flushing fluid, such as compressed air with water added thereto. The flushing fluid is intended for flushing the hole drilled by the drill bit. Rearwardly the passage 19 turns into a bore 20. A check valve generally denoted by 21 is arranged in the rear end of the bore 20. The check valve 21 can be considered as consisting of two cooperating valve members, one of which being composed by a flat valve plate 22 and a cylindrical strainer body 23 attached thereto centrally and coaxially. The mantle surface of the strainer body 23 is provided with round holes 24 to allow through-flow of the flushing fluid. The other valve member forms an insertion which is movable relative to the first valve member and comprises a circular cover 25 supported by three axially extending legs 26. The legs 26 surround the strainer body 23 and are attached to the cover 25 and a bottom ring 27.

The rotary drill bit 10 is provided with three passages 28, 29, 30, one for each leg 11, through which fluid, such as compressed air, is supplied to the bearing system 15, 16, 17, 18, for cooling thereof.

These passages are designed as an axially extending tube 31, which over a knee-tube 32 turns into a passage 33 in the leg 11 and passages 34, 35 in the bearing pin 12. The rear end of the tube 31 terminates within the strainer body 23.

The function of the check valve 21 is in detail described in the Swedish patent specification No. 7706028-3. When flushing fluid containing water reaches the check valve 21 the water is separated therefrom before the fluid enters the tube 31.

A reservoir 36 for a lubricant is arranged within the rotary drill bit 10. The reservoir 36 is rearwardly closed by a cover 37, which attaches the reservoir to the drill bit. The cover 37 is provided with recesses 38 through which the flushing fluid which passes the bottom ring 27 is conducted into the bore 20.

The lubricant in the reservoir 36 is delivered to the fluid in the tube 31 through a tube 39 and a passage 40 in the cover 37. The passage 40 terminates into the tube 31 at a portion 41 thereof having a reduced cross section area. The tube 31 also communicates with the reservoir 36 through a passage 42, which terminates into the reservoir axially behind the level of the lubricant therein. When determining the mutual axial position of two points the flow direction of the fluid is used as a reference. The inlet of the passage 42 from the tube 31 is located at a portion 43 thereof behind the portion 41.

According to the invention the outlet of the passage 40 into the tube 31 is arranged axially behind the inlet of the tube 39 in the lubricant reservoir 36. A filter 44 is inserted into this inlet. During the flow of the fluid through the portion 41 there is created a relative decrease in pressure in the fluid which causes lubricant to be sucked up through the tube 39. Since the delivery of lubricant is completely depending on the fluid flow through the tube 31 an accurately controlled delivery of lubricant is obtained.

In order to prevent fluid from flowing into the reservoir 36 when the drilling operation is stopped there is a check valve 45 mounted in the cover 37.

In the illustrated embodiment the tube 31 is arranged to traverse through the portion of the flushing fluid passage which is formed by the bore 20.

In the embodiment according to FIGS. 3 and 4 a lubricant reservoir 46 is arranged in an adapter 47, which is intended to be connected between a rotary drill bit 48 and the front end of a drill string 49. A check valve 50 of the same type as shown in FIG. 1 is mounted in the rear end of the adapter 47. A central tube 51 extends from the strainer body 52 of the check valve through the adapter 47. At a portion 53 having a reduced cross section area the tube 51 communicates with the reservoir 46 through a passage 54 and a tube 55. The tube 51 communicates through a passage 56 with the space in the reservoir 46 which is behind the level of the lubricant therein. That means, as in the embodiment according to FIG. 1, that lubricant is sucked up through the tube 55 and delivered to the substantially water-free fluid in the tube 51.

Six tubes 57 are equally spaced around the central tube 51. The flushing fluid which passes the bottom ring 58 of the check valve 50 is conducted through the tubes 57 to the drill bit 48. The lubricant reservoir 46, thus, is formed by the space in the adapter 47 which is situated between the tubes 51, 57.

The adapter 47 is intended to be used in a drill bit 48 which is particularly designed therefore. The drill bit 48 includes a rearwardly open catching means 58 which comprises a plate 60 attached to the drill bit and a blocking means in form of a cylinder 59 which is mounted on the plate 60. Fluid containing lubricant which is supplied through the tube 51 is caught by the catching means 58 and conducted further to the bearing system through a conduit 61 and passages in the leg and the bearing pin, see FIG. 1.

Flushing fluid which is supplied through the tubes 57 passes openings 62 in the plate 60 and are conducted further to the passage 19, see FIG. 1. Due to the cylinder 59 and a conical sleeve 64 attached to the tube 51 the flushing fluid is prevented from entering into the conduit 61.

I claim:

1. Apparatus for lubricating rotary drills of the type comprising at least one roller cutter with a drill bit carrying cutting means thereon, and bearing means for rotatably supporting said roller cutter; said lubricating apparatus comprising:
   at least one first passage means for conducting compressed air to the hole being drilled;
   at least one second passage means for supplying compressed air to said bearing means for cooling same;
   said second passage means including an inlet at a rear end thereof remote from said roller cutter;
   said inlet disposed radially inwardly of said first passage means and communicating therewith so that compressed air from said first passage means enters said inlet;
   said inlet including blocking means for diverting air from said first passage means radially outwardly;
   a reservoir for carrying a lubricant;
   at least one third passage means extending rearwardly from said reservoir and communicating with said second passage means; and
   means for sucking lubricant from said reservoir through said third passage means and into said second passage means.

2. Apparatus according to claim 1, wherein said reservoir is disposed within said drill bit.

3. Apparatus according to claim 1, wherein said sucking means comprises a portion of said second passage means of reduced cross-section, said third passage means communicating therewith.

4. Apparatus according to claim 3, wherein said reservoir includes a cover, said second passage means extending through said cover such that a section of said cover forms a portion of said second passage means and defines said portion of reduced cross-section.

5. Apparatus according to claim 4, wherein said sucking means further comprises at least one fourth passage means interconnecting said reservoir and said second passage means, said fourth passage means being disposed within said cover.

6. Apparatus according to claim 5, wherein there are a plurality of roller cutters, there being a second, third, and fourth passage means for each roller cutter.

7. A drill comprising:
   a drill string;
   a drill bit carrying at least one roller cutter having cutter means thereon, and bearing means for rotatably supporting said roller cutter;
   an adapter disposed between and connected to said drill string and said drill bit;
   lubricating means for lubricating said drill bit comprising:
      at least one first passage means for conducting compressed air from said string, through said adapter and drill bit and to the hole being drilled;
      at least one second passage means disposed in said adapter and drill bit for supplying compressed air to said bearing means for cooling same;
      said second passage means including an inlet disposed in said adapter;
      said inlet disposed radially inwardly of said first passage means and communicating therewith so that compressed air from said first passage means enters said inlet;
      said inlet including means for blocking the admittance of impurities along with said compressed air from said first passage means;
      a reservoir for carrying a lubricant disposed in said adapter;
      at least one third passage means extending rearwardly from said reservoir and communicating with said second passage means; and
      means for sucking lubricant from said reservoir through said third passage means and into said second passage means;
   said second passage means including catching means disposed in said drill bit, said catching means comprising a conduit open at a rear end toward a portion of said second passage means in said adapter and generally aligned with an outlet thereof for receiving lubrication-carrying compressed air therefrom, said conduit extending to said bearing means, blocking means arranged, at said rear end of said conduit to block the entry thereinto of compressed air from said first passage means.

8. A drill according to claim 7, wherein said blocking means comprises a plate attached to said drill bit, a cylinder attached to said plate and extending rearwardly therefrom, said base member including openings radially outwardly of said cylinder to define portions of said first passage means, said cylinder terminating rearwardly within said drill bit and having a diameter larger than the diameter of said outlet of said portion of said second passage means disposed in said adapter.

9. A drill according to claim 8, wherein said blocking means further comprises a conical member extending from said last-named outlet and diverging forwardly toward said conduit, the forward end of said conical member extending at least as far as said cylinder and having a diameter at least as great as said cylinder.

* * * * *